United States Patent
Ihm et al.

(10) Patent No.: US 9,036,586 B2
(45) Date of Patent: May 19, 2015

(54) METHOD OF TRANSMITTING INFORMATION ABOUT A PRE-CODING MATRIX OF A TERMINAL IN A MULTIPLE NODE SYSTEM

(75) Inventors: Binchul Ihm, Anyang-si (KR); Jiwon Kang, Anyang-si (KR); Sunam Kim, Anyang-si (KR); Jinyoung Chun, Anyang-si (KR); Sungho Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 157 days.

(21) Appl. No.: 13/818,061

(22) PCT Filed: Aug. 11, 2011

(86) PCT No.: PCT/KR2011/005888
§ 371 (c)(1),
(2), (4) Date: Feb. 20, 2013

(87) PCT Pub. No.: WO2012/023751
PCT Pub. Date: Feb. 23, 2012

(65) Prior Publication Data
US 2013/0155897 A1 Jun. 20, 2013

Related U.S. Application Data

(60) Provisional application No. 61/375,297, filed on Aug. 20, 2010.

(51) Int. Cl.
| H04W 24/02 | (2009.01) |
| H04B 7/04 | (2006.01) |
| H04B 7/02 | (2006.01) |
| H04L 5/00 | (2006.01) |
| H04L 25/03 | (2006.01) |
| H04B 7/06 | (2006.01) |

(52) U.S. Cl.
CPC .............. *H04W 24/02* (2013.01); *H04B 7/024* (2013.01); *H04B 7/0417* (2013.01); *H04L 5/0023* (2013.01); *H04L 5/0048* (2013.01); *H04L 5/0057* (2013.01); *H04L 25/03898* (2013.01); *H04L 25/03949* (2013.01); *H04B 7/0639* (2013.01)

(58) Field of Classification Search
None
See application file for complete search history.

(56) References Cited

U.S. PATENT DOCUMENTS

| 2010/0002643 | A1* | 1/2010 | Han et al. | 370/329 |
| 2010/0048232 | A1 | 2/2010 | Hwang et al. | |
| 2010/0048233 | A1* | 2/2010 | Kim et al. | 455/501 |
| 2010/0234054 | A1* | 9/2010 | Ko et al. | 455/501 |

(Continued)

FOREIGN PATENT DOCUMENTS

| JP | 2010-500790 | 1/2010 |
| KR | 10-2009-0115781 | 11/2009 |
| KR | 10-2010-0043097 | 4/2010 |

*Primary Examiner* — Phirin Sam
*Assistant Examiner* — Tarell Hampton
(74) *Attorney, Agent, or Firm* — McKenna Long Aldridge LLP

(57) ABSTRACT

A method of transmitting, by a first terminal, information about a pre-coding matrix to a base station in a multiple node system comprises the steps: measuring a downlink channel of a first node through a reference signal for CSI (Channel-State Information) measurement of the first node; measuring a downlink channel of a second node through a reference signal for decoding transmitted by the second node; and transmitting, by the first terminal, information about a pre-coding matrix for the first terminal to the base station on the basis of the measured downlink channels of the first and second nodes.

6 Claims, 7 Drawing Sheets

(56) References Cited

U.S. PATENT DOCUMENTS

| | | |
|---|---|---|
| 2010/0260151 A1* | 10/2010 | Onggosanusi et al. ....... 370/336 |
| 2010/0315970 A1* | 12/2010 | Ramamurthi et al. ........ 370/252 |
| 2010/0322227 A1* | 12/2010 | Luo .............................. 370/345 |
| 2010/0323711 A1* | 12/2010 | Damnjanovic et al. ....... 455/450 |
| 2011/0009125 A1* | 1/2011 | Shin et al. .................. 455/452.1 |
| 2012/0003981 A1* | 1/2012 | Krishnamurthy et al. .... 455/450 |
| 2012/0149362 A1* | 6/2012 | Tooher et al. ................. 455/423 |
| 2012/0250565 A1* | 10/2012 | Zhang et al. .................. 370/252 |
| 2012/0287875 A1* | 11/2012 | Kim et al. ..................... 370/329 |

\* cited by examiner

METHOD OF TRANSMITTING INFORMATION ABOUT A PRE-CODING MATRIX OF A TERMINAL IN A MULTIPLE NODE SYSTEM

This Application is a 35 U.S.C. §371 National Stage Entry of International Application No. PCT/KR2011/005888, filed Aug. 11, 2011 and claims the benefit of U.S. Provisional Application No. 61/375,297, filed Aug. 20, 2010, all of which are incorporated by reference in their entirety herein.

TECHNICAL FIELD

The present invention relates to mobile communication, and more particularly, to a method for a user equipment (UE) to transmit precoding matrix information to eliminate an interference signal generated by a neighboring node in a multi-node system.

BACKGROUND ART

Next generation mobile communication and wireless transmission systems require improved data rate and system capacity needed in a multi-cell environment. Accordingly, the multi-cell environment adopts a multi-node or multi-cell cooperative scheme in order to obtain maximum efficiency from limited resources. Such a cooperative scheme has vastly superior performance to a non-cooperative scheme in which respective nodes do not cooperate with each other by operating as independent base stations (BSs) (Node-Bs (NBs), eNode-Bs (eNBs), access points (APs), etc.).

To meet such demand, research into multiple input multiple output (MIMO) systems for transmitting data using multiple antennas is ongoing. Among MIMO systems, a closed-loop MIMO system using channel information to improve data transmission rate in multi-cell environments enhances transmission performance using the channel information. Moreover, to use a proper codebook according to each cell environment in the multi-cell environment, multiple codebooks are used to provide improved service to a UE.

Generally, in a MIMO system, the UE may discern information about a downlink channel, which is a reception channel, using received data. However, it is difficult for a BS to know the downlink channel information. Therefore, in order to improve system performance using the channel information, the BS should discern the channel information. When a time division duplex (TDD) scheme is used, since uplink/downlink channels between the BS and the UE are identical, the BS can be aware of the channel information. In the closed-loop MIMO system in the multi-cell environment, a BS allocates an optimal pre-codebook to UEs based on a channel situation between the BS and each UE in order to provide a high-quality service to the UEs in a cell.

The closed-loop MIMO system transmits data using information about transmission channels of the UEs served by the BS. In this case, since the BS does not know the information about the transmission channels of the UEs served thereby, the BS is given feedback on the channel information, for example, channel state information (CSI), a channel quality indicator (CQI), a preferred matrix index or precoding matrix index (PMI), etc., from the UEs.

In the multi-cell environment, the UE estimates a channel over which data has been transmitted using a signal received from the BS. Next, the UE calculates a CQI using the estimated channel. The CQI is used to apply a Modulation and Coding Scheme (MCS) suitable for a channel situation when the BS transmits data. Using the estimated channel and a plurality of codebooks, a channel coefficient most suitable to channel state, i.e. a precoding vector of a codebook, may be selected from a codebook used in each cell. Channel information obtained using the channel estimated by the UE is transmitted through a feedback channel between the BS and the UE. The BS selects an MCS and a precoding vector of the codebook using the channel information received from the UE. Next, the BS transmits data to the UE using the selected MCS and the selected precoding vector of the codebook.

A wireless communication system has evolved to a multi-node system having multiple accessible nodes in the vicinity of a user. The multi-node system may have higher system performance by cooperation between nodes. For example, the case in which transmission/reception of each node is managed by one control station and each node operates like an antenna (or an antenna group) for one cell exhibits much better system performance than the case in which respective nodes do not cooperate with each other by operating as independent BSs (advanced BSs (ABSs), NBs, eNBs, APs, etc.). In this case, the multi-node system may be referred to as a distributed antenna system (DAS).

The multi-node system may also operate as a multi-cell system in which each node has an independent physical identifier (ID). If the multi-cell system is configured such that coverage of respective nodes is overlaid, this is referred to as a multi-tier network.

As an element capable of configuring a node, there is a remote radio head (RRH). The node may be referred to as a point. As shown in the above example, nodes in the multi-node system may have the same physical cell ID or respective physical cell IDs.

As node density increases, interference between nodes may be severely generated in the multi-node system. For example, if a node (BS or eNB) supporting only a closed subscriber group (CSG) UE (user or MS), (generally, a CSG femto-BS or HeNB), is used in the multi-tier network, the CSG node may create very strong interference with respect to UEs except for CSG UEs present in corresponding node coverage. That is, a UE which is not served by a first node may be subjected to interference by data transmitted to a UE which is served by the first node.

In such a multi-node system, an effective method for eliminating an interference signal generated by a neighboring node is needed.

DETAILED DESCRIPTION OF THE INVENTION

Technical Problems

It is an object of the present invention to provide a method for a user equipment (UE) to transmit precoding matrix information to eliminate an interference signal generated by a neighboring signal in a multi-node system.

Technical Solutions

To achieve the above technical object, a method for transmitting, at a first user equipment, precoding matrix information in a multi-node system in accordance with one aspect of the present invention includes measuring a downlink channel of a first node using reference signals of the first node; measuring a downlink channel of a second node using reference signals of the second node; and transmitting precoding matrix information for the first user equipment based on the measured downlink channel of the first node and the measured downlink channel of the second node.

In accordance with another aspect of the present invention, a method for receiving, at a base station, precoding matrix information from a first user equipment in a multi-node system includes transmitting demodulation reference signal information transmitted by a second node to the first user equipment; and receiving precoding matrix information from the first user equipment.

In accordance with still another aspect of the present invention, a first user equipment for transmitting precoding matrix information to a base station in a multi-node system includes a radio frequency (RF) unit for transmitting and receiving a radio signal; and a processor connected to the RF unit, for controlling the RF unit, wherein the processor controls the RF unit to measure a downlink channel of a first node using reference signals of the first node, measure a downlink channel of a second node using reference signals of the second node, and transmit precoding matrix information for the first user equipment based on the measured downlink channel of the first node and the measured downlink channel of the second node.

In accordance with a further aspect of the present invention, a base station for receiving precoding matrix information from a first user equipment in a multi-node system includes a radio frequency (RF) unit for transmitting and receiving a radio signal; and a processor connected to the RF unit, for controlling the RF unit, wherein the processor controls the RF unit to transmit demodulation reference signal information transmitted by a second node to the first user equipment and to receive precoding matrix information from the first user equipment.

In accordance with each aspect of the present invention, the method for transmitting precoding matrix information may further include receiving information about the reference signal transmitted by the second node from a base station.

In accordance with each aspect of the present invention, the reference signal of the first node may be a cell-specific reference signal (CRS), a channel state information reference signal (CSI-RS), or a midamble and the reference signal of the second node may be a demodulation reference signal (DM-RS) or a user equipment (UE)-specific reference signal (RS).

In accordance with each aspect of the present invention, the method for transmitting precoding matrix information may further include receiving information about presence/absence of interference caused by the second node.

Advantageous Effects

In a multi-node system, a UE can transmit precoding matrix information for eliminating an interference signal generated by a neighboring node. Therefore, communication quality can be improved and reliable communication can be performed.

According to the present invention, inter-cell interference according to a pre-codebook can be prevented or eliminated in a system using a plurality of codebooks. Specifically, performance of an overall cell as well as a cell boundary can be improved by using codebook information of an interfering cell and restricting use of a precoding vector affecting other cells in a BS of the interfering cell to use an optimal codebook vector.

BEST MODE FOR CARRYING OUT THE INVENTION

Figure 1:
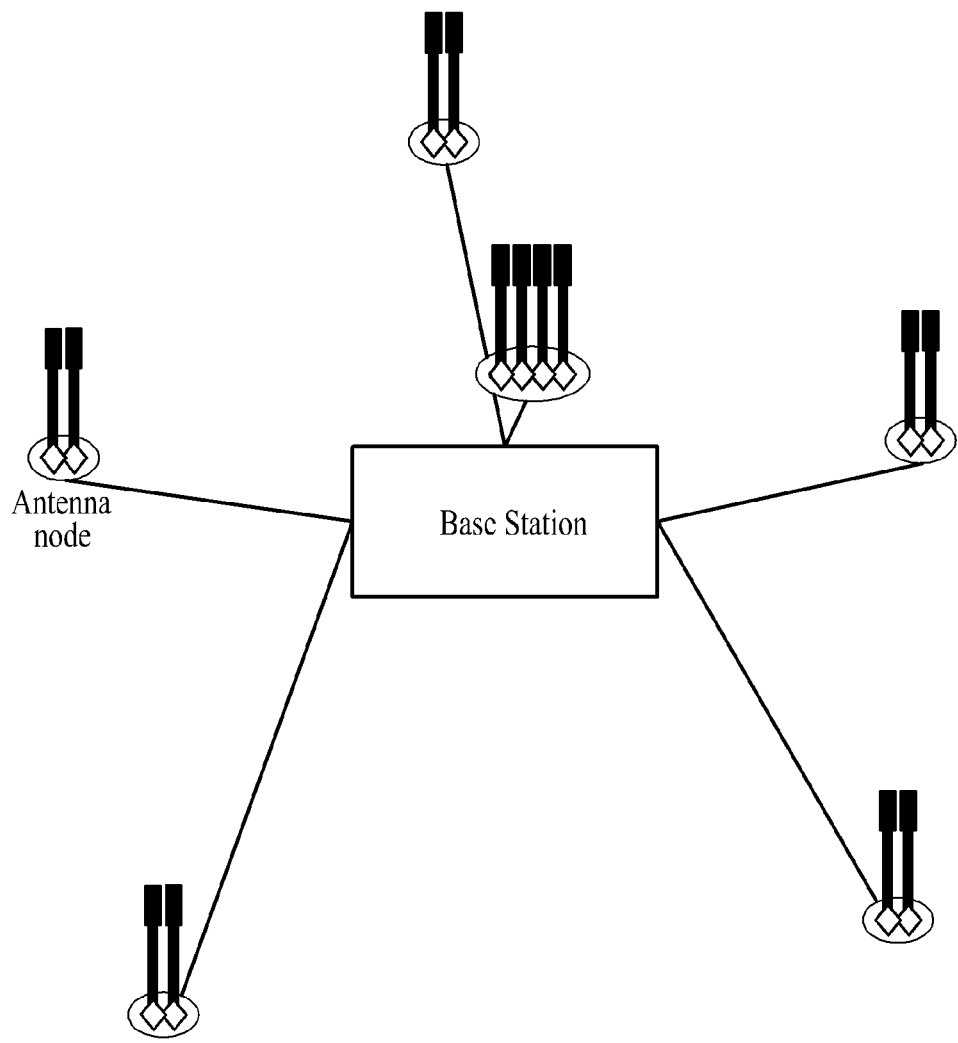
FIG. 1 illustrates an exemplary multi-node system.

Additional advantages, objects, and features of the invention will be set forth in part in the description which follows and in part will become apparent to those having ordinary skill in the art upon examination of the following or may be learned from practice of the invention.

Hereinafter, terms used to explain the present invention will be described in brief. With respect to a specific UE, a node to which the UE belongs may be referred to as a 'serving node', a node adjacent to the serving node may be referred to as a 'neighboring node', and a node generating interference with respect to the specific UE among neighboring nodes may be referred to as an 'interfering node'. That is, it should be understood that the 'serving node', 'neighboring node', and 'interfering node' are relatively determined with respect to a specific UE. In addition, BSs belonging to the 'serving node', 'neighboring node', and 'interfering node' may be referred to as a 'serving BS', 'neighboring BS', and 'interfering BS', respectively.

In the present invention which will be described hereinbelow, a node that transmits data to a first UE will be referred to as a first node, a node that generates interference with respect to the first UE will be referred to as a second node, and a UE that receives data from the second node will be referred to as a second UE. In the present invention, the first node and the second node may be nodes belonging to the same BS or nodes belonging to different BSs. For convenience, embodiments of the present invention will be described by referring to a BS for controlling the first node as a first BS and a BS for controlling the second node as a second BS.

The following technique can be used for a variety of radio access systems, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through radio technology such as universal terrestrial radio access (UTRA) or CDMA2000. TDMA may be embodied through radio technology such as global system for mobile communications (GSM)/general packet radio service (GPRS)/enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, and evolved UTRA (E-UTRA). UTRA is a part of the universal mobile telecommunications system (UMTS). 3rd generation partnership project (3GPP) long term evolution (LTE) is a part of an evolved UMTS (E-UMTS), which uses E-UTRA. 3GPP LTE employs OFDMA in downlink and employs SC-FDMA in uplink. LTE-advanced (LTE-A) is an evolved version of 3GPP LTE.

In describing the present invention, a WCDMA network or a CDMA network except for an LTE network will be referred to as a legacy network. It is also assumed that a user equipment (UE) or a device collectively refers to a mobile or fixed user terminal device such as a mobile station (MS) and a BS refers to an arbitrary node of a network stage, such as a node B or an eNode B, that communicates with the UE or device.

Additional advantages, objects, and features of the invention will be set forth in part m the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Reference will now be made to preferred embodiments of the present invention with reference to the attached drawings. Wherever possible, the same reference numbers will be used throughout the drawings to refer to the same or like parts.

FIG. 1 illustrates an exemplary multi-node system.

Referring to FIG. 1, the multi-node system includes a plurality of nodes. In FIG. 1, each node expressed as antenna nodes may be an antenna or antenna group arranged distributively in a cell but the present invention is not limited thereto. That is, the node may be a macro eNB (MeNB), a pico-cell eNB (PeNB), a home eNB (HeNB), a remote radio head (RRH), a remote radio unit (RRU), a relay, etc. The node may also be referred to as a point. In the multi-node system, each node may be managed for transmission/reception by a BS controller so that an individual node operates as a part of one cell. In this case, the multi-node system may be regarded as a distributed antenna system (DAS) forming one cell. In the DAS, respective nodes are separately arranged unlike a centralized antenna system (CAS) in which respective nodes are centrally arranged in the center of a cell.

In the multi-node system, if a respective node has an individual cell ID, this system may be regarded as a multi-cell (e.g. macro-cell/femto-cell/pico-cell) system. If coverage of each node is configured in an overlaid form in the multi-cell system, this is called a multi-tier network. The multi-tier network may be configured such that coverage of a Macro eNB and coverage of a Picocell eNB (PeNB) are overlaid. In this case, the Macro eNB and the PeNB may use their cell IDs.

Figure 3:
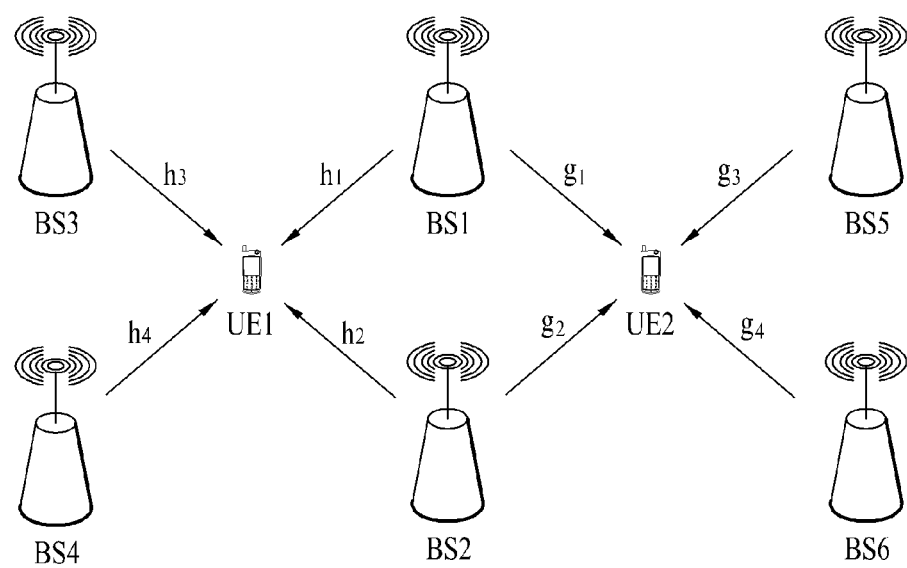
FIG. 3 illustrates exemplary intercell interference in a multi-node system.

FIG. 3 illustrates exemplary intercell interference in a multi-node system (in FIG. 3, an eNB may be replaced with a node).

Referring to FIG. 3, a first UE may receive signals from BSs 1, 2, 3, and 4 and a second UE may receive signals from BSs 1, 2, 5, and 6. In this case, the BSs 3 and 4 may be sufficiently separated from the second UE so that signals transmitted to the first UE by the BSs 3 and 4 do not create interference with respect to the second UE. The BSs 5 and 6 may be sufficiently separated from the first UE so that signals transmitted to the second UE by the BSs 5 and 6 do not create interference with respect to the first UE. The BSs 1 and 2 may multiplex signals for the first UE and signals for the second UE in the same radio resource region and then transmit the multiplexed signal. The same radio resource region refers to a time-frequency resource region comprised of the same frequency band and the same time interval. In this case, the first UE may be subjected to interference by signals transmitted to the second UE by the BSs 1 and 2 and the second UE may be subjected to interference by signals transmitted to the first UE by the BSs 1 and 2.

To solve such an interference problem, various methods are being discussed in standard specifications such as LTE-A and IEEE 802.16m. A currently potently discussed method is to cause different cells to use different radio resources by dividing radio resources usable by each cell. For example, each cell uses a different frequency, time, or code using frequency division multiplexing (FDM), time division multiplexing (TDM), or code division multiplexing (CDM). Alternatively, a method for avoiding intercell interference through downlink power control is considered. However, these methods restrict resources usable by a cell, resulting in system efficiency deterioration or scheduling restriction.

Accordingly, when receiving signals from a plurality of BSs (or distributed antennas), efficient transmission of precoding matrix information with respect to a UE which is subjected to interference is needed.

First, interference subjected to a UE in a multi-node system will be mathematically explained.

As an extended case of FIG. 3, it is assumed that the first UE receives data from B1 nodes (a total of NTx1 antennas) and the second UE receives data from B2 nodes (a total of NTx2 antennas) different from the B1 nodes.

If the number of reception antennas of the first UE is NRx1, a reception signal r1 received by the first UE is as follows.

$$r_1 = HWs + I_1 + n_1 \qquad \text{[Equation 1]}$$

In Equation 1, H is a channel matrix between the first UE and transmission antennas of B1 number of nodes and may be expressed as $H=[h_1, \ldots, h_{NTx1}]$. Here, H may be a matrix of NRx1×NTx1 size. W is a precoding matrix having a precoding row vector as an element and may be indicated by the following equation.

$$W = \begin{bmatrix} w_1 \\ w_2 \\ \vdots \\ w_{NTx1} \end{bmatrix} \qquad \text{[Equation 2]}$$

In Equation 2, W may be a matrix having NTx1×Nr1 size.

In Equation 1, s is a transmission data value and may be a vector having Nr1×1 size. Nr1 is the number of independent data streams transmitted to the first UE, i.e. the number of transmission ranks. $I_1$ denotes an interference signal and $n_1$ denotes a noise signal.

If a signal transmitted to the second UE functions as interference with respect to the first UE, $I_1$ of Equation 1 may be expressed as:

$$I_1 = [g_1 \ldots g_{NT \times 2}] \begin{bmatrix} v_1 \\ \vdots \\ v_{NT \times 2} \end{bmatrix} x \qquad \text{[Equation 3]}$$

Figure 2:
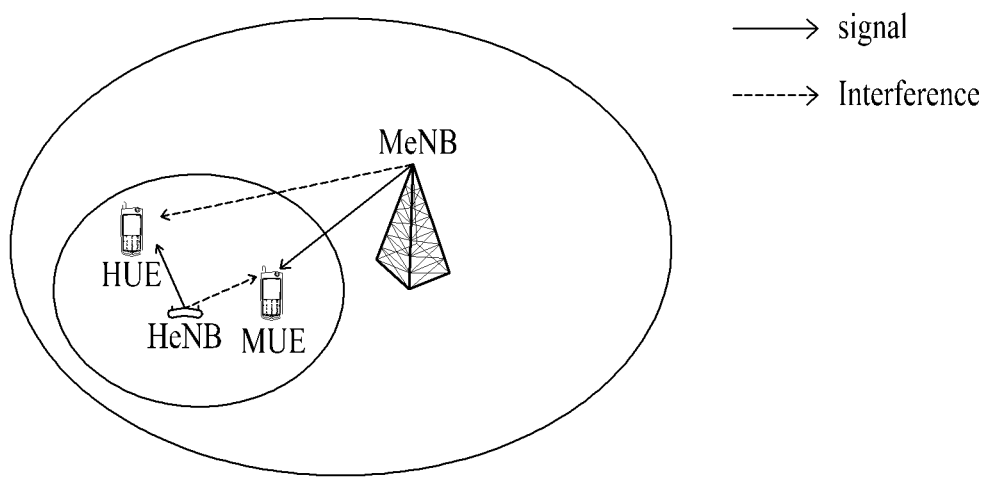
FIG. 2 illustrates exemplary intercell interference in a multi-tier network.

In Equation 3, $G=[g_1, \ldots, G_{NTx2}]$ is a channel matrix between the first UE and interference nodes. Multiplication of the channel matrix between the first UE and NTx2 transmission antennas by a signal transmitted to the second UE by applying precoding to the NTx2 transmission antennas is an interference signal in the first UE. A method for reducing interference will now be described in the case in which the first node is a Macro eNB (MeNB) and the second node is an HeNB. FIG. 2 illustrates exemplary intercell interference in a multi-tier network.

Here, the HeNB divides users into registered users and unregistered users and may be accessible only to the registered users. If an HeNB is accessible only to the registered users, the HeNB is called a closed subscriber group (CSG) PeNB. If an HeNB is accessible to general users, the HeNB is called an open subscriber group (OSG) HeNB. A hybrid scheme of the CSG PeNB and OSG HeNB may be used.

If an HeNB is configured by a CSG or OSG scheme, UEs which are not registered in the HeNB may be subjected to strong interference. For example, referring to FIG. 2, an MUE communicating with an MeNB is a UE which is not registered in the HeNB. If the MUE moves to coverage of the HeNB, a signal transmitted by the HeNB creates very strong interference with respect to the MUE.

Conventionally, in order to avoid interference caused by a signal of an MeNB, a beam direction signal from an HeNB present in coverage of the MeNB to an HeNB based UE (HUE) has been changed. That is, a signal has been transmitted by changing a beam direction from the HeNB in coverage of the MeNB to the HUE so as to prevent interference with a signal transmitted between the MeNB and an MUE. In other words, a method for preventing interference with respect to the MUE which is not registered in the HeNB by changing a precoding vector transmitted from the HeNB has been used. However, this method has difficulty in performing stable link adaptation because the amount of information which should be exchanged between the MeNB and the HeNB through a backbone network or an X2 interface is considerable and the amount of interference undergone by the MUE is changed whenever measured. Accordingly, a null scheme in which the MeNB and the HeNB exchange scheduling information and the HeNB does not use a radio resource used when the MUE receives data from the MeNB has been proposed. However, since, in this scheme, the MeNB and the HeNB dividedly use a given radio resource, optimal throughput cannot be provided in terms of overall system capacity. The method for changing a serving beam between the HeNB and the HUE has great loss and the MUE obtains slight gain. Therefore, overall system performance is deteriorated.

Hereinbelow, the embodiments of the present invention will be described by an example of the case in which a first eNB is an MeNB and a second eNB is an HeNB. However, each eNB according to the present invention is not limited to the MeNB or the HeNB.

Accordingly, instead of the conventional method for changing a beam direction between a second eNB which creates interference with respect to a first UE and a second UE, the present invention proposes a method for changing a beam direction of the first eNB to which the first UE belongs to the first UE. For example, referring to FIG. 2, a method for changing a beam direction of the MeNB to which the MUE undergoing interference by a beam of the HeNB with respect to the HUE belongs is proposed without changing a beam direction between the HeNB and the HUE located in coverage of the HeNB. The beam direction of an eNB to a UE may be determined by a precoding matrix.

Figure 4:
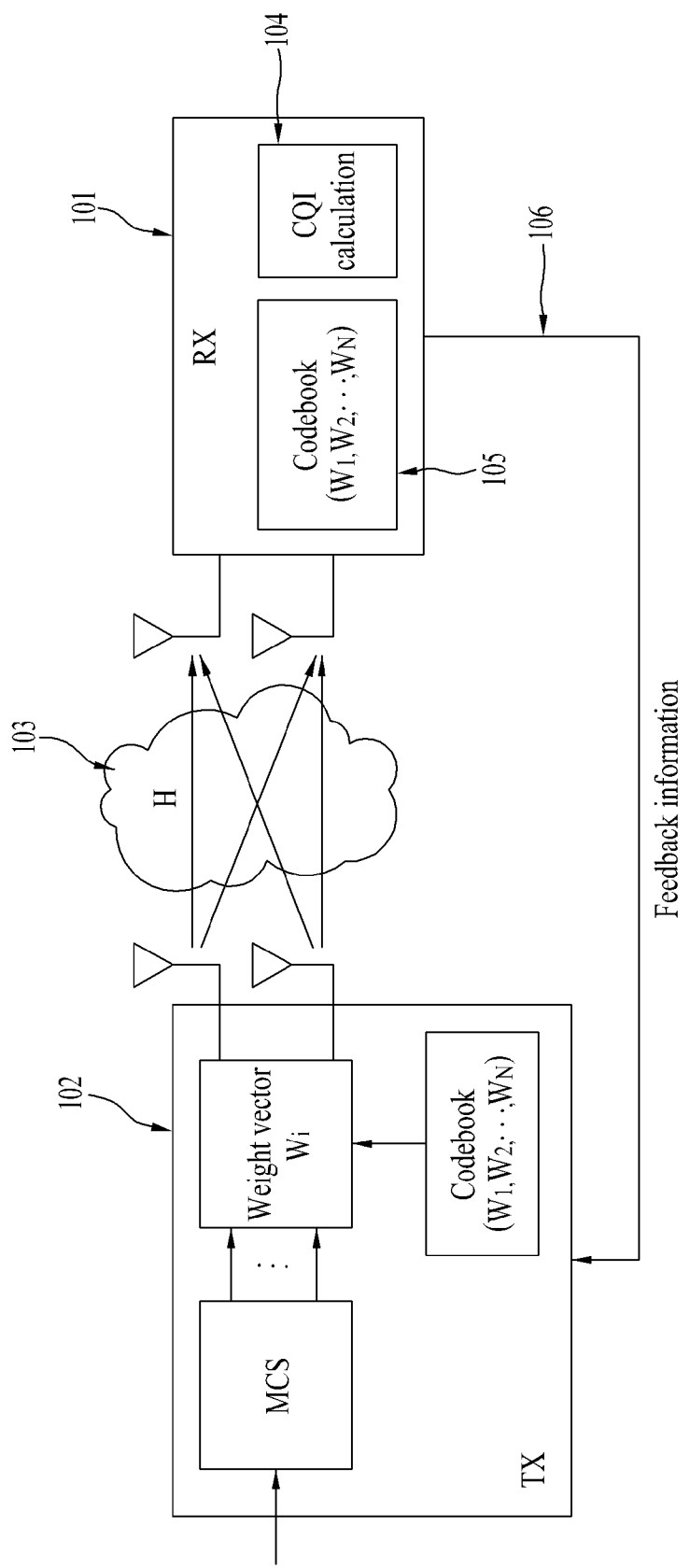
FIG. 4 illustrates the configuration of a system using a closed-loop MIMO scheme.

FIG. 4 is a diagram illustrating configuration of a system using a closed loop MIMO scheme. Since BSs ($BS_1 \ldots BS_N$) are unable to discern information about transmission channels of MSs ($MS_1 \ldots MS_K$), the BSs receive channel information, for example, CSI, a CQI, a PMI, etc. which is fed back from UEs. Next, the BSs transmit data using the transmission channel information of the UEs served thereby. A UE 101 estimates a channel 103 through which data has been received using signals received from a BS 102. The UE 101 calculates a CQI so as to apply an MCS suitable for a channel situation when the BS 102 transmits data (104). The UE selects the most proper channel coefficient suitable for a channel situation, i.e. a precoding vector of a codebook, using the estimated channel and the codebook (105). The channel information obtained using the estimated channel by the UE 101 is transmitted through a feedback channel 106 between the BS 102 and the UE 101. The BS 102 transmits data to the UE using the channel information received from the UE 101, the selected MCS, and the precoding vector of the codebook. When the UE selects the precoding vector or matrix for downlink transmission to the UE, the case in which interference of a second node is considered and the case in which interference of the second node is not considered. That is, in order to calculate a beam direction of an MeNB, the precoding matrix is differently determined according to whether there is interference from an HeNB. If there is interference from the HeNB, a beam direction of the MeNB is determined in consideration of channel information of the HeNB and a beam direction of the HeNB. In the case in which interference of the second node is considered, precoding matrix information of the first node is calculated as follows.

A low-speed first node based UE may exchange more data with a first node through a closed loop-MIMO (CL-MIMO) operation. For this operation, the UE measures a downlink channel H of the first node and calculates and feeds back a PMI, CQI, etc. Upon calculating the PMI, the UE may obtain the PMI robust to interference using a premeasured downlink channel G of the second node. That is, when calculating the PMI in the case where the downlink channel G of the second eNB is not considered, the PMI which can form the strongest beamforming from the first eNB is calculated and fed back. However, if the interference of the second eNB is considered, a PMI satisfying the following criterion may be calculated.

$$\underset{k}{\mathrm{argmax}} C(w_k) \qquad \text{[Equation 4]}$$

where $w_k \in$ codebook,
$C(w_k)$=capacity(H, $w_k$, G, $V_{HeNB}$) or SINR(H, $w_k$, G, $V_{HeNB}$),
$V_{HeNB}$ means interface precoding vector (or matrix) from HeNB In Equation 4, $C(W_k)$ denotes a capacity or a signal-to-interference-plus-noise-ratio (SINR), $W_k$ denotes a k-th beam of a codebook, and G denotes a channel from an interfering node, for example, a channel of the HeNB in FIG. 2. $V_{HeNB}$ denotes an interference precoding vector or matrix from the HeNB. $V_{HeNB}$ may receive a signal through a backbone network when there are multiple controllers or multiple cells.

To calculate a PMI satisfying the above criterion, an MUE should discern the parameters H, G, and $V_{HeNB}$. While H and G may be measured using a channel measurement pilot such as a cell-specific reference signal (CRS), a channel state information-reference signal (CSI-RS), and a midamble of an HeNB, $V_{HeNB}$ cannot be directly measured. Accordingly, the HeNB informs the MeNB of $V_{HeNB}$ and the MeNB informs the MUE of $V_{HeNB}$. Alternatively, the MeNB informs the MUE of demodulation pilot information such as demodulation reference signal (DMRS) information of the HeNB so that the MUE can directly measure $G \times V_{HeNB}$. The DMRS information includes a sequence, a resource block (RB) type, an allocated resource type, a port location, the number of beams, the number of ranks, etc. When the HeNB performs beamforming with respect to the HUE, the MUE may obtain information of $G \times V_{HeNB}$ by measuring or monitoring a DMRS of the HeNB with respect to the HUE based on the demodulation pilot information. Generally, the demodulation reference signal is transmitted to the UE based on a transmission layer (or transport stream) transmitted to the UE. At this time, since the DMRS is precoded using the same precoding matrix as the transport layer, product of the downlink channel matrix G of an eNB transmitting the DMRS and a beamforming vector V of the eNB with respect to the UE may be identified through detection of the DMRS by the UE. Namely, through measurement of a specific data transmission signal, a signal of G×V$_{HeNB}$ can be obtained using the DMRS information. The MUE may select a desired precoding matrix W$_k$ to be used for transmission to the MUE by the MeNB through Equation 4 based on the above information.

Through the above-described method, an embodiment of the present invention maintains a beam between the HeNB and the HUE and changes a beam between an MUE which is a victim UE due to an interference signal and the MeNB, thereby improving overall system performance. That is, a beam signal of the MeNB is changed to a signal which is orthogonal to an interference signal beams of the HeNB lest interference be generated between an interference beam from the HeNB to the MUE and a beam transmitted from the MeNB to the MUE. Through such a method, the amount of information exchanged between the MeNB and the HeNB can be reduced and the amount of interference experienced by the MUE is stabilized. Thus, overall system throughput is increased.

Nonetheless, since V$_{HeNB}$ varies over time, continuous notification of V$_{HeNB}$ may generate continuous overhead. Therefore, according to another embodiment of the present invention, W$_k$ may be obtained by calculating C(W$_k$)=capacity(H, W$_k$, G) without V$_{HeNB}$ in order to reduce such overhead. In this case, while all columns of G may be used, only partial columns having great size may be used. The column of G means a channel up to a reception antenna of the MUE from a transmission antenna (or antenna port) of the HeNB.

Meanwhile, when interference is absent, C(W$_k$)=capacity (H, W$_k$) may be used and, when interference is present, C(W$_k$)=capacity(H, W$_k$, G) or C(W$_k$)=capacity(H, W$_k$, G, V$_{HeNB}$) may be used. To this end, the MeNB may inform the MUE whether interference from the HeNB is present. This is because efficiency is lowered when W$_k$ is calculated under the assumption that interference is present with respect to all signals. Accordingly, the capacity of C(W$_k$) is differently calculated to detect W$_k$ depending on whether there is interference. While throughput of the MUE can be raised through a beam adaptation method from the MeNB when there is interference from the HeNB, a beam from the MeNB should be obtained by the conventional method when there is no interference from the HeNB. Hence, the MUE should recognize whether an interference channel is present. Namely, the MUE can efficiently eliminate interference without the need for unnecessary calculation only when the MUE recognizes whether interference is present. The MeNB should inform the MUE how W$_k$ should be obtained. For example, if interference from the HeNB is absent, W$_k$ information obtained from C(W$_k$)=capacity(H, W$_k$) is fed back to the MUE. If interference from the HeNB is present, the MUE may command the MeNB to feed back W$_k$ information obtained using C(W$_k$)=capacity(H, W$_k$, G) or C(W$_k$)=capacity(H, W$_k$, G, V$_{HeNB}$). Alternatively, the MUE may selectively use W$_k$ information which is fed back for all cases when interference is present and when interference is absent. That is, the MUE transmits W$_k$ information which is calculated when interference is present, when interference is absent, or for both cases to the MeNB through a feedback channel between the MUE and the MeNB.

As another example of the present invention, even when a UE feeds back a plurality of PMIs, the PMIs may be obtained based on a channel of an interfering node and a channel of a serving node as described above. A criterion for calculating two PMIs in a UE which feeds back the two PMIs is as follows.

$$\underset{k,m}{\operatorname{argmax}} C(w_k^{(1)}, w_m^{(2)}) \qquad \text{[Equation]}$$

where
$w_k^{(1)} \in \text{codebook}^{(1)}$, $w_m^{(2)} \in \text{codebook}^{(2)}$
$C(w_k^{(1)}, w_m^{(2)}) = \text{capacity}(H, w_k^{(1)}, w_m^{(2)}, G, v_{HeNB})$,
v$_{HeNB}$ means interference precoding vector (or matrix) from HeNB As indicated in Equation 5, one beam can be obtained by multiplying w$_k^{(1)}$ and w$_m^{(2)}$ acquired from two different codebooks.

Namely, if the UE feeds back information of w$_k^{(1)}$ and w$_m^{(2)}$, an eNB combines two corresponding precoding vectors or matrices to configure one precoding vector or matrix. Alternatively, an optimal codebook vector except for a vector may be used.

Figure 5:
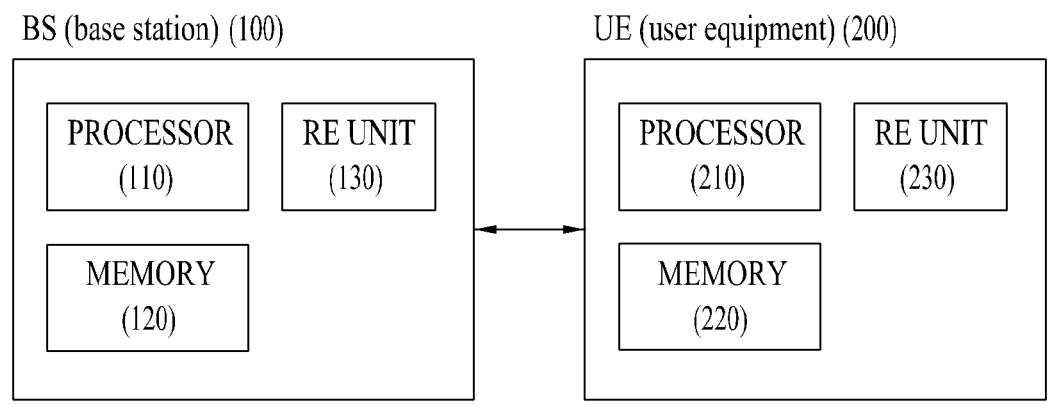
FIG. 5 is a block diagram of a BS and UE.

FIG. 5 is a block diagram illustrating a BS and a UE.

A BS 100 includes a processor 110, a memory 120, and a radio frequency (RF) unit 130. The processor 110 performs functions, processes, and/or methods proposed according to the embodiments of the present invention. For example, the processor 110 measures a channel signal received by the RF unit 130 from one or more HeNBs which create interference with respect to a signal from an MeNB. The processor 110 controls the RF unit 130 so as to transmit information about a DMRS transmitted by a second node to a first UE and controls the RF unit 130 as to receive precoding matrix information from the first UE. The processor 110 is configured to transmit information about presence/absence of interference caused by the second node to the first UE. The memory 120 is connected to the processor 110 and stores various information for driving the processor 110. The RF unit 130 is connected to the processor 110 and transmits and/or receives radio signals under the control of the processor 110. The RF unit 130 may be comprised of a plurality of nodes connected by wire to the BS 100. The processor 110 may select a precoding matrix/vector to be applied to transmission data transmitted to the first UE, based on the precoding matrix information received from the first UE by the RF unit 130. The processor 110 precodes data for the first UE using the selected precoding matrix/vector and controls the RF unit 130 so as to transmit the precoded transmission data to the first UE.

A UE 200 includes a processor 210, a memory 220, and an RF unit 230. The processor 210 may receive information about a precoding matrix applied to an interference signal from a BS (hereinafter, a first BS) to which the UE (hereinafter, a first UE) belongs and uses the information to eliminate an interference signal transmitted by another BS (hereinafter, a second BS).

The processor 210 may control the RF unit 230 to receive antenna configuration information by. The processor 210 may select a precoding matrix desired to be applied to a signal transmitted by a first node to the first UE. In a multi-node system, the processor 210 may measure a downlink channel of the first node through an RS of the first node, measure a downlink channel of a second node through an RS of the second node, select a precoding matrix for the first UE based on the measured downlink channels of the first and second nodes, and generate information indicating the precoding matrix preferred by the first UE. The processor 210 may control the RF unit 230 so as to transmit the precoding matrix information to the first BS. The processor 210 may control the RF unit 230 so as to receive information about an RS transmitted by the second node from the BS. The processor 210 may control the RF unit 230 so as to detect a DMRS of the second node transmitted to the second UE, using the RS of the second node received by the RF unit 230. The processor 210 may calculate interference with respect to the first UE through a downlink channel between the second node and the first UE, using the RS of the second node.

The processor 210 may control the RF unit 230 so as to receive information indicating whether there is interference caused by the second node. The precoding matrix information may be determined based on downlink channels of the second node and the first UE, calculated using the RS information by the first UE and on a downlink channel of the first BS. Therefore, the processor 210 may obtain a preferred precoding matrix based on downlink channels of the second node and the first UE, calculated using the RS information by the first UE and on a downlink channel of the first BS. The processor 210 may feed back information indicating the preferred precoding matrix to the BS.

The memory 220 is connected to the processor 210 and stores various information for driving the processor 210. The RF unit 230 is connected to the processor 210 and transmits and/or receives radio signals.

Each of the processors 110 and 210 may include an application-specific integrated circuit (ASIC), a chipset, a logical circuit, a data processing unit, and/or a converter for converting a baseband signal or a radio signal into the radio signal or the base signals. Each of the memories 120 and 220 may include a read-only memory (ROM), a random access memory (RAM), a flash memory, a memory card, a storage medium, and/or a storage unit. Each of the RF units 130 and 230 may include one or more antennas for transmitting and/or receiving a radio signal. When the embodiments are implemented by software, the above-described methods may be achieved by modules (processes, functions, etc.) for performing the above-described functions. The modules may be stored in the memories 120 and 220 and may be driven by the processors 110 and 210. The memories 120 and 220 may be located inside or outside the processors 110 and 210 and may be connected to processors 110 and 210 through various well-known means.

Figure 6:
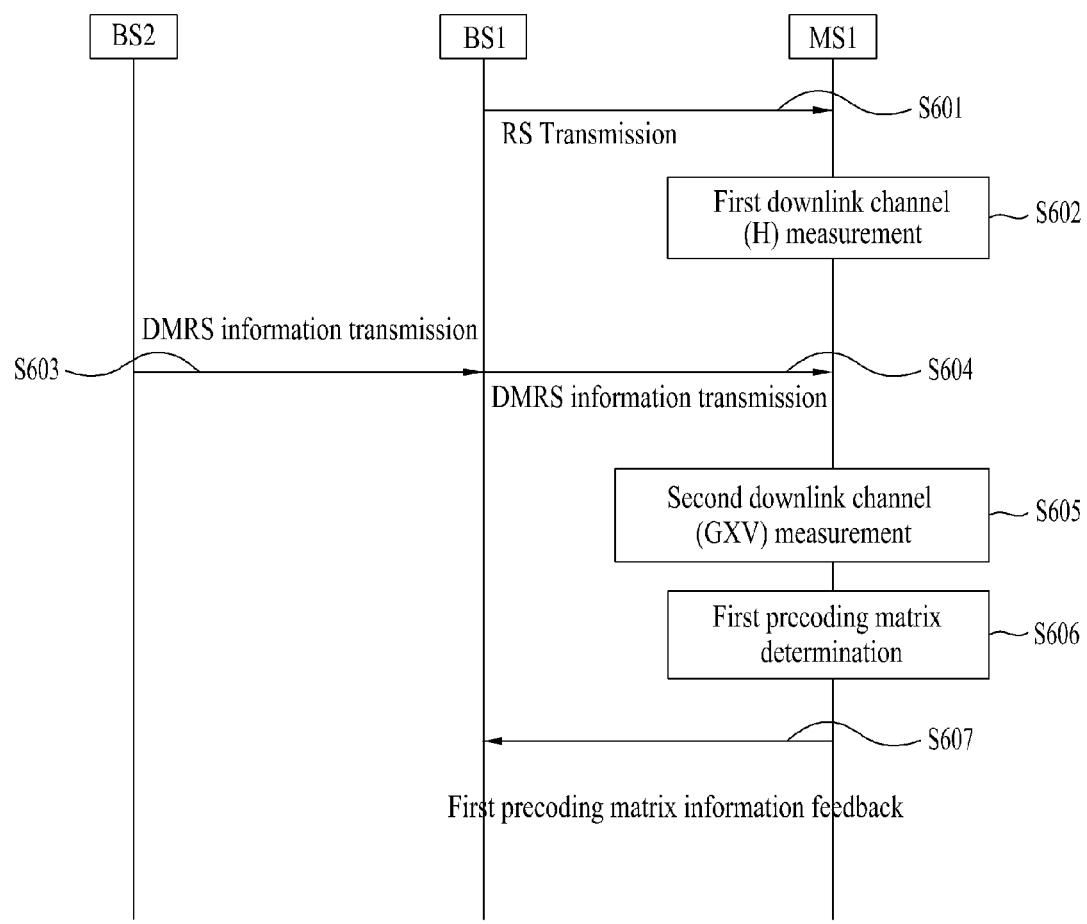
FIG. 6 is a flowchart according to an embodiment of the present invention.

FIG. 6 is a flowchart illustrating an embodiment of the present invention.

Hereinbelow, the embodiment of the present invention will be described by referring a BS of a first node to as a first BS and a BS of a second node to as a second BS. The first BS and the second BS may be one entity or different entities and the embodiments of the present invention may be applied to both cases.

FIG. 6 illustrates an example of a method for a first UE (MS1) to transmit precoding matrix information to the first BS in a multi-node system. The first BS (BS1) transmits an RS used for state measurement of a channel formed between the first BS and the first UE to the first UE (step S601). The RS is known to the first BS and the first UE and is used for channel measurement. The RS may be referred to as other terms such as a pilot, a midamble, etc. The first UE measures a first downlink channel of the first BS using the RS (step S602). The second BS (BS2) transmits DMRS information of the second BS to the first BS wirelessly or through a backbone network (step S603). The first UE receives the DMRS information of the second BS from the first BS (step S604). The first UE measures a second downlink channel of the second BS with respect to a second UE using the DMRS information (step S605). The second downlink channel corresponds to an interference channel of a signal transmitted to the second UE by the second BS with respect to the first UE. The second BS transmits a signal x (e.g. a data or DMRS) to be transmitted to the second UE in the second node using a precoding vector/matrix $V_{HeNB}$ by forming a beam. The transmitted signal $V_{HeNB} \times x$ may serve as interference with respect to the first UE and this interference signal $V_{HeNB} \times x$ may undergo a channel G between the first UE and the second node. Upon recognizing the channel G and the beam vector $V_{HeNB}$, the first UE can be aware of a signal creating interference with respect thereto. The second downlink channel $G \times V_{HeNB}$ may be measured using the DMRS because the DMRS is precoded before transmission by the same precoding vector/matrix as the data signal. Therefore, the first UE can obtain information about product of the channel matrix G of the second node and the precoding matrix $V_{HeNB}$ of the second UE. That is, the first UE is able to discern channel information G formed between the second node and the first UE and the beam $V_{HeNB}$ formed in the direction of the second UE by the second node. Accordingly, the first UE determines first precoding matrix information based on downlink channel information of the second BS and downlink channel information of the first BS (step S606). The first UE feeds back the determined first precoding matrix information to the first BS (step S607). The first BS determines a precoding matrix for the first UE, using the first precoding matrix information and applies the precoding matrix to data to be transmitted to the first UE, thereby eliminating or minimizing interference caused by a signal transmitted to the second UE by the second BS.

Figure 7:
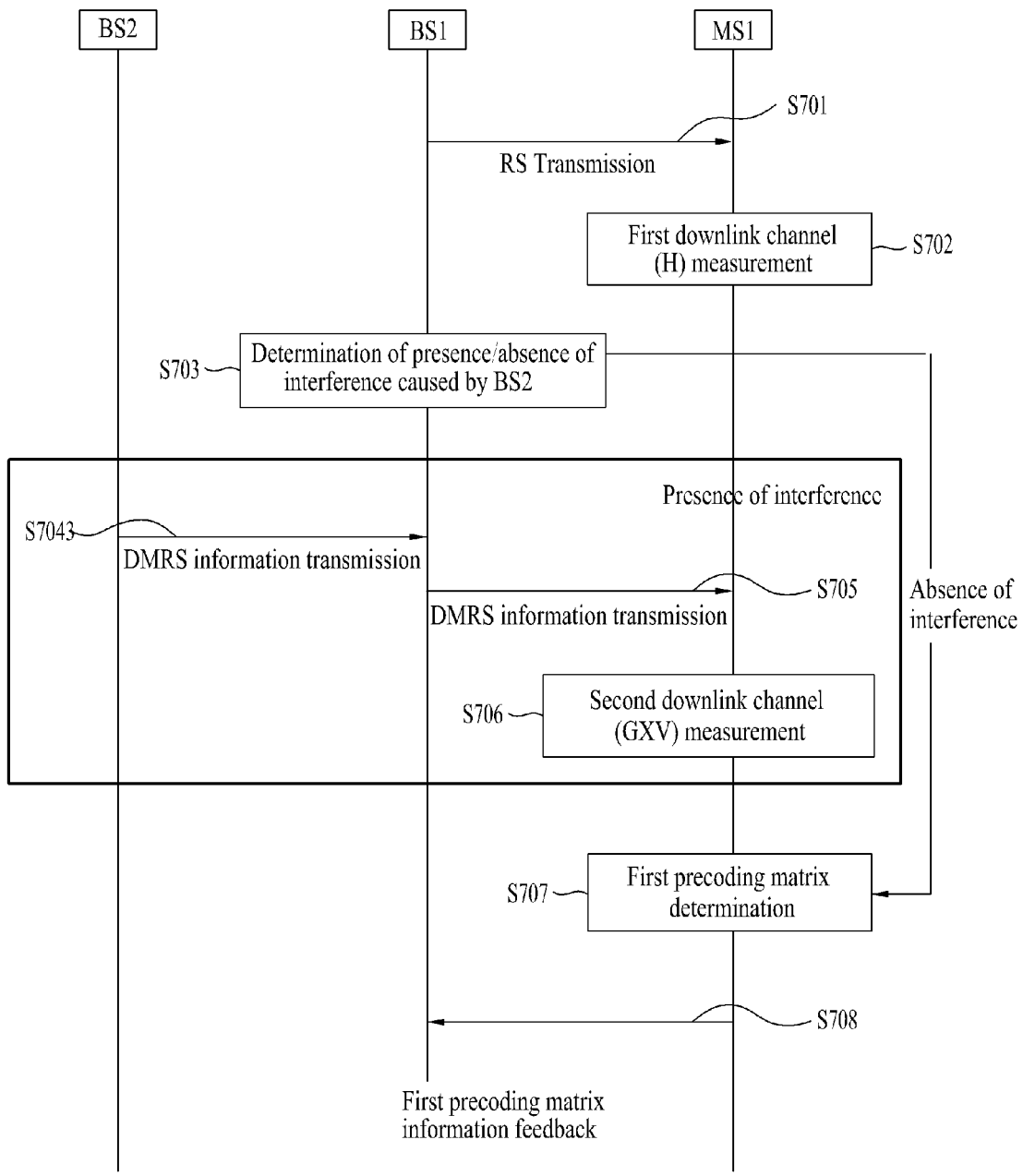
FIG. 7 is a flowchart according to another embodiment of the present invention.

FIG. 7 is a flowchart illustrating another embodiment of the present invention.

FIG. 7 illustrates another embodiment of the method for the first UE (MS1) to transmit precoding matrix information in a multi-node system. The first BS (BS1) transmits an RS to the first UE to measure a channel signal received from the first BS to the first UE (step S701). The first UE measures a first downlink channel matrix H of the BS using the RS (step S702). The first BS determines whether the first UE is subjected to interference by a signal transmitted by the second BS (BS2) to a second UE within coverage of the second BS and transmits the determined result to the first UE (step S703). If the first UE is subjected to interference from the second UE, the second BS transmits information about a DMRS of the second BS with respect to the second UE to the first BS (step S704). The first MS receives the DMRS information of the second BS with respect to the second UE, which is transmitted to the first BS (step S705). The first UE measures a second downlink channel of the second BS using the DMRS (step S706). The second downlink channel corresponds to an interference channel of a signal transmitted by the second BS to the second UE with respect to the first UE. The second BS transmits a signal x (e.g. a data or DMRS) to be transmitted to the second UE in the second node using a precoding vector/matrix $V_{HeNB}$ by forming a beam. The transmitted signal $V_{HeNB} \times x$ may serve as interference with respect to the first UE and this interference signal $V_{HeNB} \times x$ passes through a channel G between the first UE and the second node. Upon recognizing the channel G and the beam vector $V_{HeNB}$, the first UE can be aware of a signal creating interference with respect thereto. The second downlink channel $G \times V_{HeNB}$ may be measured using the DMRS x because the DMRS is precoded before transmission by the same precoding vector/matrix as the data signal. Therefore, the first UE can obtain information about product of the channel matrix G of the second node and the precoding matrix $V_{HeNB}$ of the second UE by measuring a second downlink channel of the second node expressed as a $G \times V_{HeNB}$ form. That is, the first UE is able to discern channel information G formed between the second node and the first UE and information about a beam $V_{HeNB}$ formed in the direction of the second UE by the second node. The first UE determines first precoding matrix information based on downlink channel information $G \times V_{HeNB}$ of the second BS and downlink channel information H of the first BS (step S707). The first UE feeds back the determined first precoding matrix information to the first BS (step S708).

If no interference from the second BS is present, the first UE determines first precoding matrix information based on the first downlink channel information of the first BS without performing the procedure for measuring and transmitting the data channel state information of the second BS (step S707). The first UE feeds back the determined first precoding matrix information to the first BS (step S708). The first BS may eliminate or minimize interference from the second BS, using the first precoding matrix information.

In description of FIG. 6 and FIG. 7, the embodiments of the present invention may be identically applied even when the first BS and the second BS are replaced with the first node and the second node, respectively. As described above, the first node and the second node may be controlled by the same BS or different BSs.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment. It is obvious to those skilled in the art that claims that are not explicitly cited in each other in the appended claims may be presented in combination as an embodiment of the present invention or included as a new claim by subsequent amendment after the application is filed.

The above-described embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSDPs), Programmable Logic Devices (PLDs), Field Programmable Gate Arrays (FPGAs), processors, controllers, microcontrollers, microprocessors, etc.

In a firmware or software configuration, the method according to the embodiments of the present invention may be implemented in the form of a module, a procedure, a function, etc. Software code may be stored in a memory unit and executed by a processor. The memory unit is located at the interior or exterior of the processor and may transmit and receive data to and from the processor via various known means.

INDUSTRIAL APPLICABILITY

While the above-described precoding matrix information transmission method in a UE of a multi-node system and an apparatus therefore have been described as an example applied to the 3GPP LTE system, the method and apparatus are applicable to various wireless communication systems in addition to the 3GPP LTE system.

What is claimed is:

1. A method for transmitting precoding matrix information at a first user equipment in a multi-node system, the method comprising:
receiving indication information from a first node, the indication information indicating whether or not the first user equipment is subject to interference by signals transmitted by the second node;
measuring a downlink channel of the first node using a reference signal of the first node;
when the indication information indicates that the first user equipment is subject to interference by signals transmitted by the second node, measuring a downlink channel of a second node using a reference signal of the second node; and
transmitting precoding matrix information for the first user equipment to the first node, wherein the precoding matrix information is determined based on the measured downlink channel of the first node when the indication information indicates that the first user equipment is not subject to interference by signals transmitted by the second node, and wherein the precoding matrix information is determined based on both the measured downlink channel of the first node and the measured downlink channel of the second node when the indication information indicates that the first user equipment is subject to interference by signals transmitted by the second node.

2. The method according to claim 1, further comprising:
receiving information about the reference signal transmitted by the second node from the first node.

3. The method according to claim 1, wherein the reference signal of the first node is a cell-specific reference signal (CRS), a channel state information reference signal (CSI-RS), or a midamble and the reference signal of the second node is a demodulation reference signal (DM-RS) or a user equipment (UE)-specific reference signal (RS).

4. A first user equipment for transmitting precoding matrix information to a first node in a multi-node system, the first user equipment comprising:
a radio frequency (RF) unit for transmitting and receiving a radio signal, the RF unit receiving indication information from the first node, the indication information indicating whether or not the first user equipment is subject to interference by signals transmitted by the second node; and
a processor connected to the RF unit, for controlling the RF unit,
wherein the processor controls the RF unit to measure a downlink channel of the first node using a reference signal of the first node, measure a downlink channel of a second node using a reference signal of the second node when the indication information indicates that the first user equipment is subject to interference by signals transmitted by the second node, and transmit precoding matrix information for the first user equipment to the first node, wherein the precoding matrix information is determined based on the measured downlink channel of the first node when the indication information indicates that the first user equipment is not subject to interference by signals transmitted by the second node, and wherein the precoding matrix information is determined based on both the measured downlink channel of the first node and the measured downlink channel of the second node when the indication information indicates that the first user equipment is subject to interference by signals transmitted by the second node.

5. The first user equipment according to claim 4, wherein the processor controls the RF unit to receive information about reference signals for demodulation transmitted by the second node from the base station first node.

6. The first user equipment according to claim 4, wherein the reference signal of the first node used by the processor is a cell-specific reference signal (CRS), a channel state information reference signal (CSI-RS), or a midamble and the reference signal of the second node is a demodulation reference signal (DM-RS) or a user equipment (UE)-specific reference signal (RS).

* * * * *